US012656150B2

(12) United States Patent (10) Patent No.: US 12,656,150 B2
Audouy (45) Date of Patent: Jun. 16, 2026

(54) ABSOLUTE POSITION SENSOR

(71) Applicant: Sonceboz Automotive S.A.,
Sonceboz-Sombeval (CH)

(72) Inventor: Christophe Audouy,
Sonceboz-Sombeval (CH)

(73) Assignee: Sonceboz Automotive S.A.,
Sonceboz-Sombeval (CH)

( * ) Notice: Subject to any disclaimer, the term of this
patent is extended or adjusted under 35
U.S.C. 154(b) by 78 days.

(21) Appl. No.: 18/553,889

(22) PCT Filed: Apr. 6, 2022

(86) PCT No.: PCT/EP2022/059140
§ 371 (c)(1),
(2) Date: Oct. 4, 2023

(87) PCT Pub. No.: WO2022/214554
PCT Pub. Date: Oct. 13, 2022

(65) Prior Publication Data
US 2024/0192026 A1 Jun. 13, 2024

(30) Foreign Application Priority Data

Apr. 6, 2021 (FR) ...................................... 2103509

(51) Int. Cl.
*G01D 5/14* (2006.01)
*G01D 18/00* (2006.01)
(52) U.S. Cl.
CPC ........... *G01D 5/145* (2013.01); *G01D 18/006*
(2013.01); *G01D 2205/26* (2021.05)
(58) Field of Classification Search
CPC ... G01D 5/145; G01D 18/006; G01D 2205/26
See application file for complete search history.

(56) References Cited

U.S. PATENT DOCUMENTS 8,326,490 B2 12/2012 Burgdorf et al.
10,122,311 B2 * 11/2018 Andrieux ............ H02P 23/0004
(Continued)

FOREIGN PATENT DOCUMENTS

WO 2007/107530 A2 9/2007
WO 2012/136481 A1 10/2012

OTHER PUBLICATIONS

International Search Report for Application No. PCT/EP2022/
059140 dated Jul. 15, 2022, 2 pages.
(Continued)

*Primary Examiner* — Reena Aurora
(74) *Attorney, Agent, or Firm* — TraskBritt

(57) ABSTRACT

A mechatronic system comprises an electric actuator for
driving a mechanical member, and drive electronics for
controlling the actuator associated with a position sensor
including at least one magnetosensitive probe including a
programmable digital switch delivering an electrical signal
dependent on the angular position of the mechanical mem-
ber. The drive electronics comprise a microcontroller having
at least one wake-up mode corresponding to the activation of
the microcontroller only by a programmable wake-up cir-
cuit. The position sensor comprises a programmable wake-
up circuit delivering a signal to a bus in the event of the
mobile member moving. One of the microcontrollers con-
trols, upon activation by a wake-up signal transmitted by the
programmable digital switch: initialization of the access
control register for controlling access to the EEPROM
memory, writing of a digital datum to an EEDATA register
of the EEPROM memory, and switching to rest mode at the
end of a predetermined period.

12 Claims, 7 Drawing Sheets

(56)     References Cited

U.S. PATENT DOCUMENTS 11,437,940 B2 *   9/2022   Audouy .................. H02P 6/153
2005/0012480 A1 *   1/2005   Takeuchi ............. G05B 19/231
                                                    318/265

OTHER PUBLICATIONS

International Written Opinion for Application No. PCT/EP2022/
059140 dated Jul. 15, 2022, 7 pages.

* cited by examiner

ABSOLUTE POSITION SENSOR

CROSS-REFERENCE TO RELATED APPLICATIONS

This application is a national phase entry under 35 U.S.C. § 371 of International Patent Application PCT/EP2022/059140, filed Apr. 6, 2022, designating the United States of America and published as International Patent Publication WO 2022/214554 A1 on Oct. 13, 2022, which claims the benefit under Article 8 of the Patent Cooperation Treaty of French Patent Application Serial No. FR2103509, filed Apr. 6, 2021.

TECHNICAL FIELD

The present disclosure relates to a mechatronic system comprising an electric actuator controlled by drive electronics comprising a microcontroller provided with a low-consumption standby mode and a wake-up function, and a position sensor provided with a low-consumption standby mode and a wake-up function.

BACKGROUND

Such mechatronic systems are used to control motorized moving members whose position can also be modified manually. When the mechatronic system is functioning, manual modifications of the motorized member are detected by the sensor and are recorded by the microcontroller in the same way as when the movement results from a command from the electric actuator.

When the mechatronic system is switched off, for example, when the vehicle is stopped when it is automotive equipment, the electronic drive electronics are no longer powered, to avoid unnecessary consumption, and manual movement of the movable member leads to a mismatch between the data recorded by the microcontroller, when the mechatronic system is turned on, and the actual position. The operation of the equipment is then severely disturbed.

For vital functions such as power steering, it is impossible to satisfy such a situation, since the steering wheel can be maneuvered inadvertently when the vehicle is stopped, whereas it is imperative that the position recorded in the memory of the microcontroller is the real angular position.

Many solutions have therefore been proposed to solve this problem. These solutions generally rely on a fairly widespread feature of microcontrollers, namely switching to "very low consumption" or idle mode, and the possibility of controlling the output of this mode by a signal over an LIN/CAN/PWM bus ordering a switch to normal mode (the "wake-up" function). Of course, it is then necessary to provide a power supply making it possible to power the mechatronic system even when the vehicle is stopped, and it is customary to provide a relay, controlled by a low-intensity signal, to power the equipment during its wake-up periods, or a direct connection to the battery (usually determined by a connection on the "Klemme 30").

These solutions—essential for critical functions—involve a significant excess cost to allow operation during these occasional wake-up periods.

For example, in the prior art, patent application WO07107530 is known based on the idea of early detection of the appearance of steering movements, or at least one change of steering angle, with a sensor element, in particular, an additional element sensitive to the magnetic field. A steering angle sensor arrangement is used to measure a steering angle, but such that, during a vehicle state of inactive ignition, the steering angle sensor arrangement is set to an inactive state, with the element sensitive to the additional magnetic field, in particular, remaining active or partially active and the change of the magnetic field in the case when one occurs recognizes a steering movement, whereby the steering angle sensor arrangement is fully or partially activated. The activated steering angle sensor arrangement detects and stores the steering angle movement(s) until it is placed in the primarily inactive state due to the absence of steering movements or until the ignition of the motor vehicle is activated. The stored steering angle data is then immediately transmitted to the control system of the motor vehicle.

This solution is not satisfactory because the consumption remains significant to power the probe that must remain functional, including during the switch to standby mode, which is acceptable for safety members but not for multiple equipment, the cumulative residual consumption of which becomes significant. Indeed, it comprises three active components integrating one or more microcontrollers, namely the ECU, the detection probe and an electronic computer module integrating a memory and a wake-up controller to activate the management of the memory. The probe controller consumes current continuously, even when the vehicle is stopped and the electrical circuit is in rest mode, as well as the ECU. The computing module certainly comprises a microcontroller without consumption in standby mode, but when it is activated, the consumption is significant. Moreover, the solution described provides a probe whose current consumption remains, in all circumstances, identical to its nominal consumption, which can be acceptable for safety members only. When a vehicle is equipped with a multitude of such equipment, the cumulative residual consumptions of the probes results in an unacceptable drop in the charge of the battery.

International patent application WO2012136481A1 is also known, describing a method for detecting an angular position of at least one shaft of a motor vehicle when the ignition is turned off. At least one multipole wheel comprising magnets is arranged on the shaft(s). The method is carried out by way of a sensor assembly that comprises at least one magnetic field-sensitive sensor element, by way of which a magnetic field generated by the magnets is detected. When the vehicle ignition is turned off, the movements of the steering wheel are detected by the steering angle sensor and electronically recorded. When the ignition is turned on, these data are used to calculate the current steering angle in the case where no fault has been recorded. In order to meet current consumption requirements during standby mode, the sensor is periodically powered on.

This solution is not satisfactory in that the position can be erroneous if the position changes when the sensor is not powered on. This solution does not offer any possibility of modifying the position of the monitored mechanical member.

The solutions of the prior art do not make it possible to comply with the minimum consumption levels expected for motor vehicles equipped with a plurality of driven mechatronic assemblies, for example, a plurality of orientable aeration and air conditioning outlets distributed within the passenger compartment of a vehicle, in addition to a mechatronic safety system such as power steering. The maximum acceptable consumption is typically 100 micro-amperes, which it is difficult to achieve with a solution of the prior art, and more still when the vehicle has a large number of motorized equipment.

In particular, with the solutions of the prior art, the consumption in "wake-up" mode becomes significant for a fairly long period of time, because the functions of the microcontroller are relatively complete, and provides for the processing of the digital signals to calculate an angular numerical value and to record this value in a memory generally requiring that a minimum current be maintained.

It also emerges from the prior art that periodic activation of the position sensor makes it possible to reduce consumption in standby mode, but also leads to a risk of providing an erroneous position if the system moved when the sensor was not activated.

BRIEF SUMMARY

The present disclosure aims to overcome these disadvantages by proposing, according to its most general form, a mechatronic system comprising a housing comprising an electric actuator for driving a mechanical member, and also drive electronics for controlling the electric actuator associated with a position sensor consisting of at least one magnetosensitive probe, at least one being a programmable digital switch delivering an electrical signal dependent on the angular position of a permanent magnet driven by the mechanical member, characterized in that the drive electronics comprise a microcontroller having at least one wake-up mode corresponding to the activation of the microcontroller only by a programmable wake-up circuit, the drive electronics and/or the programmable digital switch furthermore comprising an EEPROM read-only memory, the position sensor comprises a programmable wake-up circuit delivering a signal to the first bus in the event of the mobile member moving, the position sensor has a standby consumption of less than 100 μA, one of the microcontrollers controlling, upon activation by a wake-up signal transmitted by the programmable digital switch:

a) the initialization of the access control register to the EEPROM memory, b) the writing of a digital datum to an EEDATA register of the EEPROM memory, and c) the switching to rest mode at the end of a predetermined period counted starting from the last transmission of a signal by the position sensor.

Preferably, the microcontroller of the control circuit has at least two wake-up modes, a first mode corresponding to the activation of the microcontroller alone, a second mode corresponding to the activation of the microcontroller and peripherals.

According to a first variant, the EEPROM read-only memory is integrated into the drive electronics.

According to a second variant, the EEPROM read-only memory is integrated into the programmable digital switch.

According to an advantageous embodiment, the mechatronic system comprises three programmable digital switches and the data recorded in the EEPROM memory corresponding to the digital value of the movement is determined as a function of the state of the three programmable digital switches.

The present disclosure also relates to a method for controlling a mechatronic system comprising a housing comprising an electric actuator for driving a mechanical member, and also drive electronics for controlling the electric actuator associated with a position sensor including at least one magnetosensitive probe, at least one being a programmable digital switch delivering an electrical signal depending on the angular position of a permanent magnet driven by the mechanical member, characterized in that the drive electronics comprise a microcontroller having at least one wake-up mode corresponding to the activation of the microcontroller only by a programmable wake-up circuit, the drive electronics and/or the programmable digital switch furthermore comprising an EEPROM read-only memory, the position sensor comprises a programmable wake-up circuit delivering a signal to the first bus in the event of the mobile member moving, the position sensor has a standby consumption of less than 100 μA, one of the microcontrollers controlling, upon activation by a wake-up signal transmitted by the programmable digital switch:

a) the initialization of the access control register to the EEPROM memory, b) the writing of a digital datum to an EEDATA register of the EEPROM memory, and c) the switching to rest mode at the end of a predetermined period counted starting from the last transmission of a signal by the position sensor.

Advantageously, the method for controlling a mechatronic system according to the present disclosure is characterized in that the microcontroller has at least two wake-up modes (wake-up controller), a first mode corresponding to the activation of the microcontroller alone, a second mode corresponding to the activation of the microcontroller and peripherals.

In another embodiment, the method for controlling a mechatronic system according to the present disclosure is characterized in that the EEDATA register contains by default a first value VO during the stopping of the mechatronic system, and in that the activation of the wake-up by a signal on the second port orders the microcontroller to perform a verification of the content of the EEDATA register, and, a) in the case where this value is different from VO, the microcontroller controls an initial step of recalibrating the position and then writing, in the EEDATA register of the EEPROM memory, the first value VO, and b) in the case where the content of the register is the first value VO, proceeding directly to normal operating mode.

Finally, in another variant, the method for controlling a mechatronic system according to the present disclosure is characterized in that the digital datum recorded in the EEPROM is a first value VO during the stopping of the mechatronic system and a second value VALPHA during the detection of a modification of the position, the value VALPHA corresponding to the position after modification, and in that when power is restored to the mechatronic system, the EEDATA register is ordered to switch to read mode and in that the value VALPHA is ordered to be transferred to the register of the random-access memory intended for the recording of the position provided by the sensor.

Finally, the present disclosure also relates to a mechatronic system according to the aforementioned system, characterized in that it comprises multiple reduction stages driving an output wheel, and, optionally, in that the position sensor measures the angular position of the output wheel. The permanent magnet then advantageously constitutes the rotor of the electric actuator.

According to a first variant, the position sensor measures the angular position of the output wheel.

According to a second variant, the permanent magnet constitutes the rotor of the electric actuator.

BRIEF DESCRIPTION OF THE DRAWINGS

The present disclosure will be better understood from reading the following description of a detailed example embodiment, shown by the accompanying drawings, in which.

DETAILED DESCRIPTION

Figure 1:
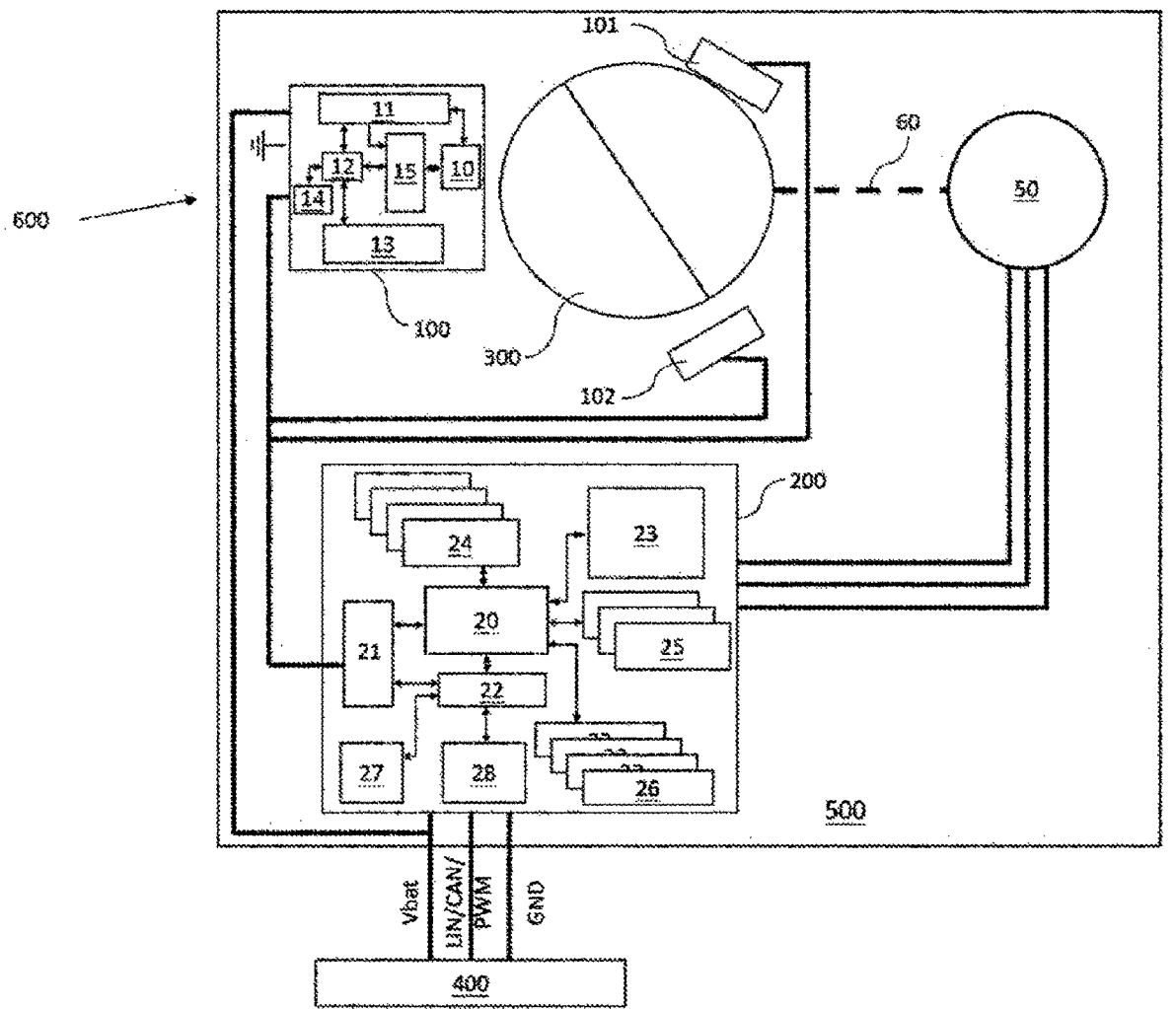
FIG. 1 shows a schematic diagram according to the present disclosure when three magnetosensitive probes are used.

The mechatronic system (600) is integrated into a housing comprising:

an electric actuator (50) mechanically connected by a transmission (60) to a mechanical member to be moved, either by direct drive or by the intervention of a movement transformation, and drive electronics (200) comprising the power supply of the electric actuator (50).

The drive electronics (200) comprise an architecture partitioned between a microcontroller (20) managing the computing functions and a programmable wake-up controller (22), as well as a port controller (21), peripheral driver circuits (23 to 26), such as, for example, circuits generating the PWM control signals or the power inverter powering the electric actuator (50), an EEPROM memory (27) and a Flash memory (28). These drive electronics (200) communicate in a known manner with an on-board computer (400), commonly called an "ECU" for "Electronic Control Unit," which controls the mechatronic systems of the vehicle based on the driver's commands and on the data coming from the various sensors equipping the vehicle. The drive electronics (200) receives the commands from the ECU (400) and generates the signals, for example, in the form of pulse width modulation (PWM) signals, powering the coils of the actuator. The mechatronic system (600) further comprises a position sensor formed on the one hand by a permanent magnet (300) mounted on the axis of the actuator, directly or on an output shaft driven by the axis of the actuator by a gear train, and on the other hand by at least one magnetosensitive probe (100) being a programmable digital switch and optionally other magnetosensitive probes (101, 102), which may be of more conventional architecture.

A programmable digital switch (100) delivers a pulse whenever a magnetic switch occurs. By adding two additional magnetosensitive probes (101, 102), it is also possible to provide a signal encoding the angular position. Each digital switch (100) comprises three pins, for supplying power directly from the vehicle battery, and not from the interrupted power supply when the vehicle is stopped, one for the ground and one for the output and the connection to a bus.

In general, all of the components of the control circuit described above are integrated into a single microcontroller, but, depending on the application, it is possible that there might be no suitable commercial solution. In this case, one or more elements can be dissociated from the microcontroller in order to meet the specifications, for example, in the case where the power delivered by the inverter is too great, and a dedicated component must be used.

Application

The mechatronic system (600) according to the present disclosure is particularly suitable for motorization of equipment that can also be actuated manually, for example, the orientable flaps of a dashboard air vent. Such equipment can be motorized to automate orientation, in two complementary directions, one with respect to an axis perpendicular to the transverse plane of the air outlet, and the other with respect to a transverse axis. The motorization makes it possible to orient the air flow in an optimal manner for the comfort of the driver and passengers. When the vehicle is stopped, these equipment items are put out of service, and when the vehicle is restarted, it is of course essential that the saved position, used to calculate the end of travel and allow correct control of the actuator, corresponds to the actual position. However, the driver might have manually changed the orientation of the flaps, either inadvertently or in order to position the starting flow in a desired direction. It is essential in this case that the new position is taken into account when restarting. The object of the present disclosure is to manage this imperative with a solution limiting the electrical consumption as much as possible during the period of stoppage.

Architecture of the Programmable Digital Switch

The programmable digital switch is a magnetosensitive probe (100) comprising a bidirectional Hall-effect sensor (10) connected to an analog front-end conditioning circuit (11) polarizing the Hall-effect sensor (10) and ensuring the pre-processing of the analog signals. The data is then processed by a microcontroller (12) connected to an output (14) in an open collector mode. The programmable digital switch incorporates an EEPROM read-only memory (13) for registering an application code. A programmable wake-up circuit (also called a "wake-up controller") (15) is dedicated to the wake-up function of the microcontroller (12). The consumption of the programmable wake-up controller (15) has a minimal consumption, less than 10 μA on average, in idle mode.

In the event of the permanent magnet (300) moving relative to the Hall-effect sensor (10), the electrical current produced triggers the wake-up of the programmable wake-up controller (15), which executes a program for recording in the EEPROM memory (13) of a digital datum, which can be limited to one bit.

Alternatively, the code executed by the programmable wake-up controller (15) commands the sending of a sequence of data at the output (14), this sequence possibly comprising a simple "displacement" state flag, or information coding the angle of displacement measured from the information coming from the three magnetosensitive probes (100 to 102).

Architecture of the Drive Electronics (200)

The drive electronics (200) have input/output ports (21) and a microcontroller (20) as well as a programmable wake-up controller (22). The microcontroller (20) controls the operation of multiple peripherals, typically the control circuits of the PWM signals, the peripheral drivers (24), sensors (25) and coil control components (26), as well as a Flash memory (28) and an EEPROM memory (27) intended to record the operating code of the microcontroller (20). The current consumed in standby mode is typically 25 μA.

The secondary programmable wake-up controller has multiple wake-up modes: namely a time-delayed wake-up mode, a general wake-up mode controlling the reactivation of all of the functionalities of the microcontroller (20) and of its peripherals; and a restricted wake-up mode controlling the execution of a program limited to writing into the EEPROM memory (27) of the datum present on the input bus.

Functional Architecture with a Single Magnetosensitive Probe (100)

Figure 2:
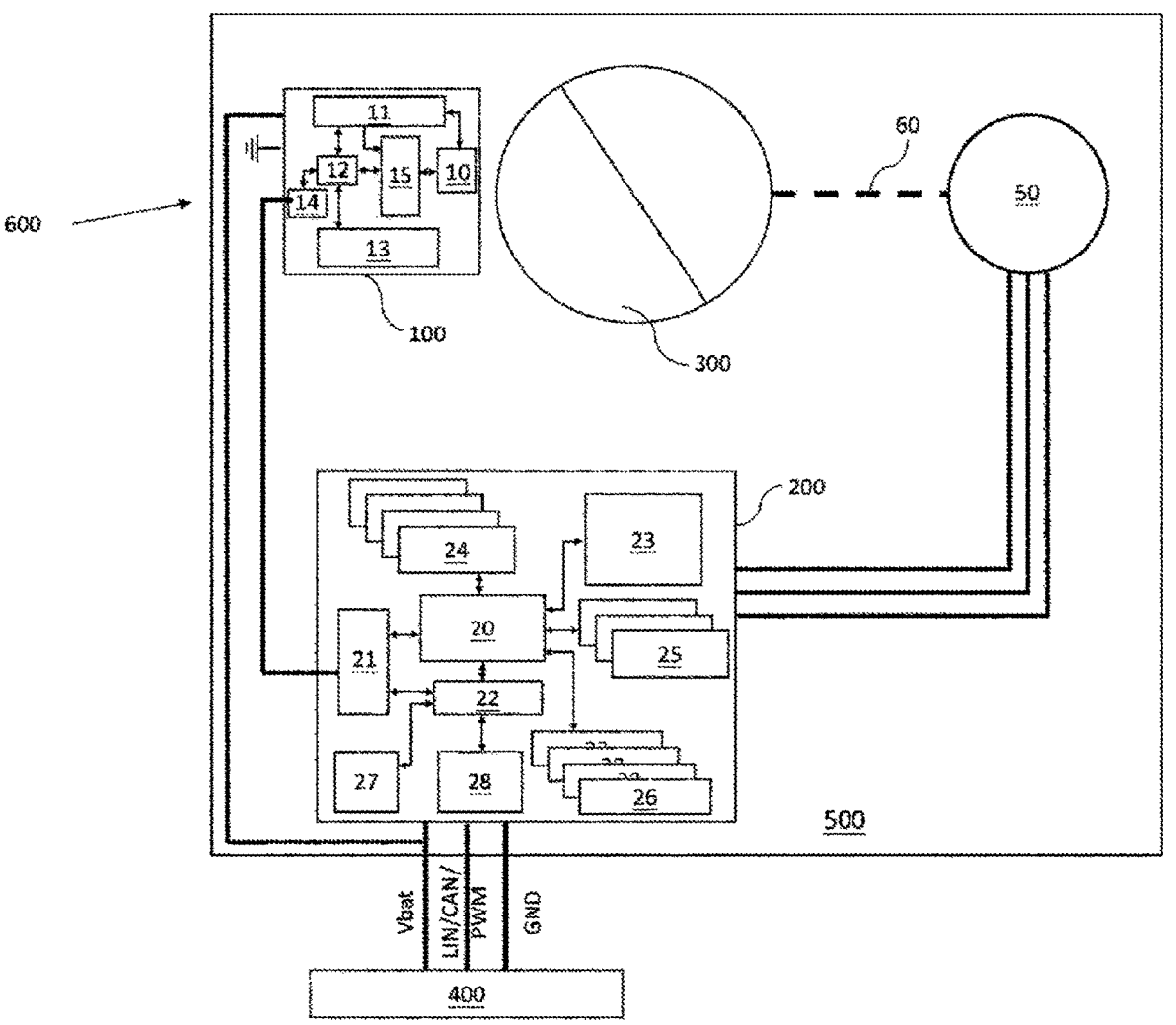
FIG. 2 shows a schematic diagram of a variant with a single magnetosensitive probe according to the present disclosure.
Figure 7:
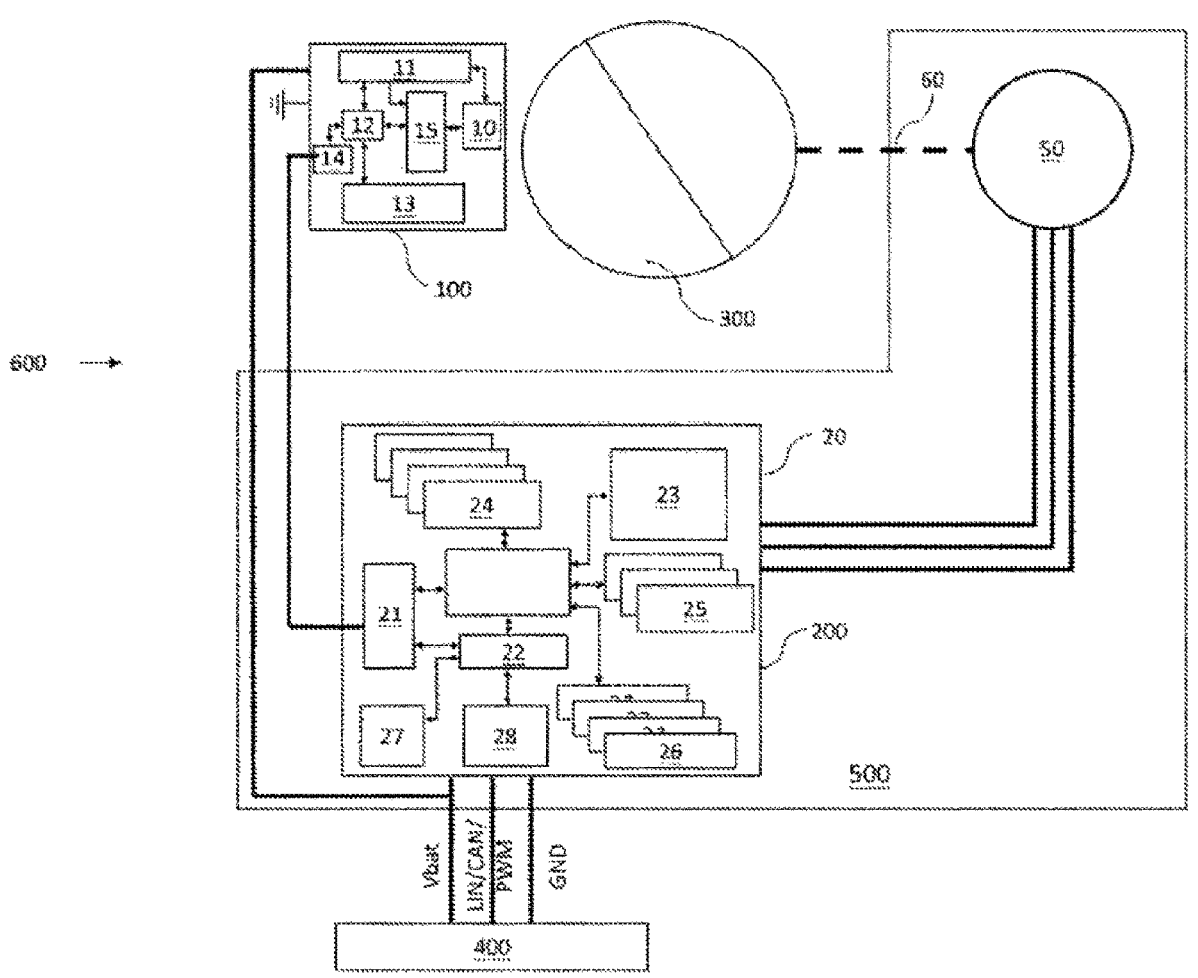
FIG. 7 shows a schematic diagram of a variant embodiment for which the sensor is remote from the housing of the mechatronic system.

In the case where the mechatronic system (600) comprises a single magnetosensitive probe (100), as shown by FIGS. 2 and 7, the latter being a programmable digital switch, the detection of a movement during the stopping of the vehicle and the standby state of the electronic circuits causes the execution of a very simple code requiring very few machine cycles, limited to:

a) the initialization of the access control register to the EEPROM memory;

b) the writing of a digital datum to an EEDATA register of the EEPROM memory; and c) the switching to rest mode at the end of a predetermined period counted starting from the last transmission of a signal by the position sensor.

By default, the EEDATA register contains a value VO, recorded during the active mode. The value recorded in the register in the event of movement is a different value, VD. It may be a simple flag encoded on a single bit.

During reboot, the controller checks the status of the EEDATA register. If it contains the value VO, the movable member occupies the same position as at the time of the shutdown, and control can resume with the prior values.

If the value read in the EEDATA register is different from VO, the drive electronics (200) orders a recalibration sequence consisting, for example, of pivoting the movable member until it reaches the mechanical stop, in order to carry out a recording of the value provided by the position sensor in this reference situation.

Alternatively, the mechatronic system (600) can also move the movable member to a predetermined position before returning to a low-consumption mode; in this case, when the system is woken up, the position will be known to the microcontroller.

According to another variant, the programmable digital switch stores the flag information without waking up the microcontroller, and the microcontroller checks the state of the flag of the probe at startup.

Functional Architecture with Three Magnetosensitive Probes (100 to 102)

If the position sensor comprises three magnetosensitive probes (100 to 102) as shown in FIG. 1, at least one being a programmable digital switch, it is possible to determine the position during the wake-up phases, and the value recorded in the EEPROM memory may not be a flag, but a digital sequence coding the real position.

In this case, during the restart, the drive electronics (200) replaces the angular value recorded in the EEPROM, when the latter is different from the default value VO, with the value corresponding to the last position before standby mode was applied.

A single sensor integrating a programmable wake-up controller (15) is necessary for this architecture, the two other magnetosensitive probes (101) and (102) being able to be Hall-effect position sensors without an integrated wake-up controller and being able to be supplied via the drive electronics (200).

The use of three built-in switches, each a programmable wake-up controller, can optionally be used in the case of a system requiring faster detection of the movement of the movable member. In this case, the actual position or a flag can be recorded in the EEPROM memory.

Alternatively, the mechatronic system (600) can also move the movable member to a predetermined position before returning to a low-consumption mode; in this case, when the mechatronic system is woken up, the position will be known to the drive electronics (200).

Integrating the Functional Architecture into a Positioning Actuator

Figure 3:
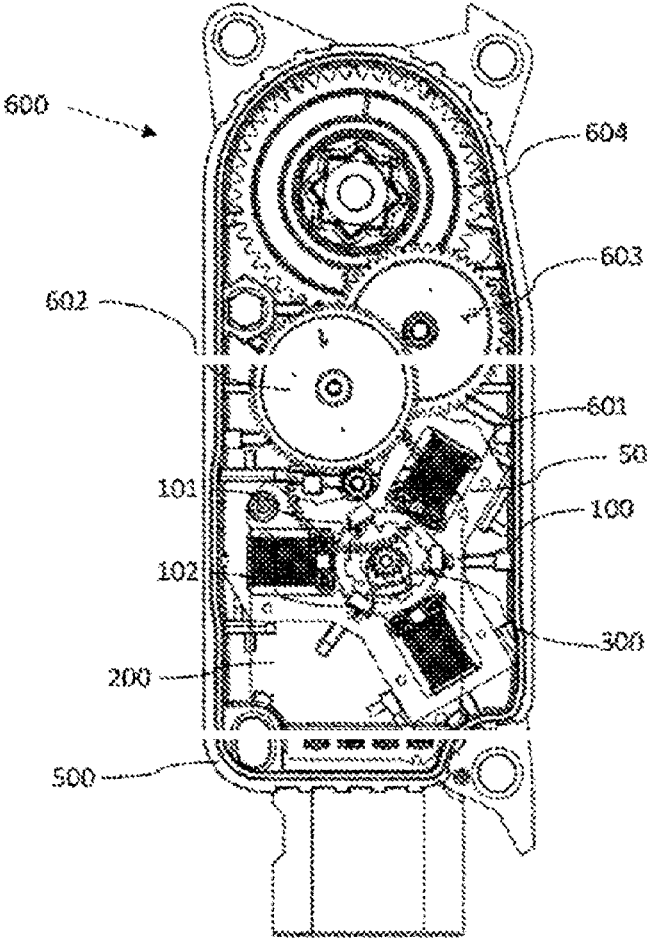
FIG. 3 shows the integration of the drive device according to the present disclosure, integrated into a geared motor.

FIG. 3 shows an example of a mechatronic system (600) according to the present disclosure, in the form of a positioning actuator. In this embodiment, at least one of the magnetosensitive probes (100 to 102) measuring the position of the permanent magnet (300) linked to the rotor is a programmable digital switch. Advantageously, the programmable digital switches can replace the Hall probes driving the rotor, thus avoiding an expensive redundancy of these sensors.

The particular case shown in FIG. 3, included in the present disclosure in a geared motor having a very high reduction in movement (greater than 200) between the rotor and the output wheel (604), by virtue of multiple reduction stages (601 to 603). Such a configuration makes it possible to use only a single programmable digital switch, measuring the position of the rotor to ensure the detection of movement during the standby phases. Indeed, the high reduction makes it possible to obtain a large variation in the angle of the rotor for a very small movement of the member driven by the output wheel (604), so it is not necessary for the programmable digital switches to be numerous in order to improve the detection of a movement in the standby phase.

This configuration is however not limiting on the present disclosure, since for safety reasons, it is sometimes preferable to directly measure the position of the driven member by way of a sensor located on the output wheel (604). The improvement in positioning sensitivity is improved by multiplying the number of magnetosensitive probes or the number of magnetic transition of the measured magnet.

Finally, the present disclosure is not limited to the measurement of the position of the rotor, as the detection of the movement of the rotor and the recording in memory of an item of information, commonly called a flag, meaning that a movement took place during the standby period, is sufficient to trigger a recalibration when the actuator wakes up.

Example Applications Incorporating the Present Disclosure

Figure 4:
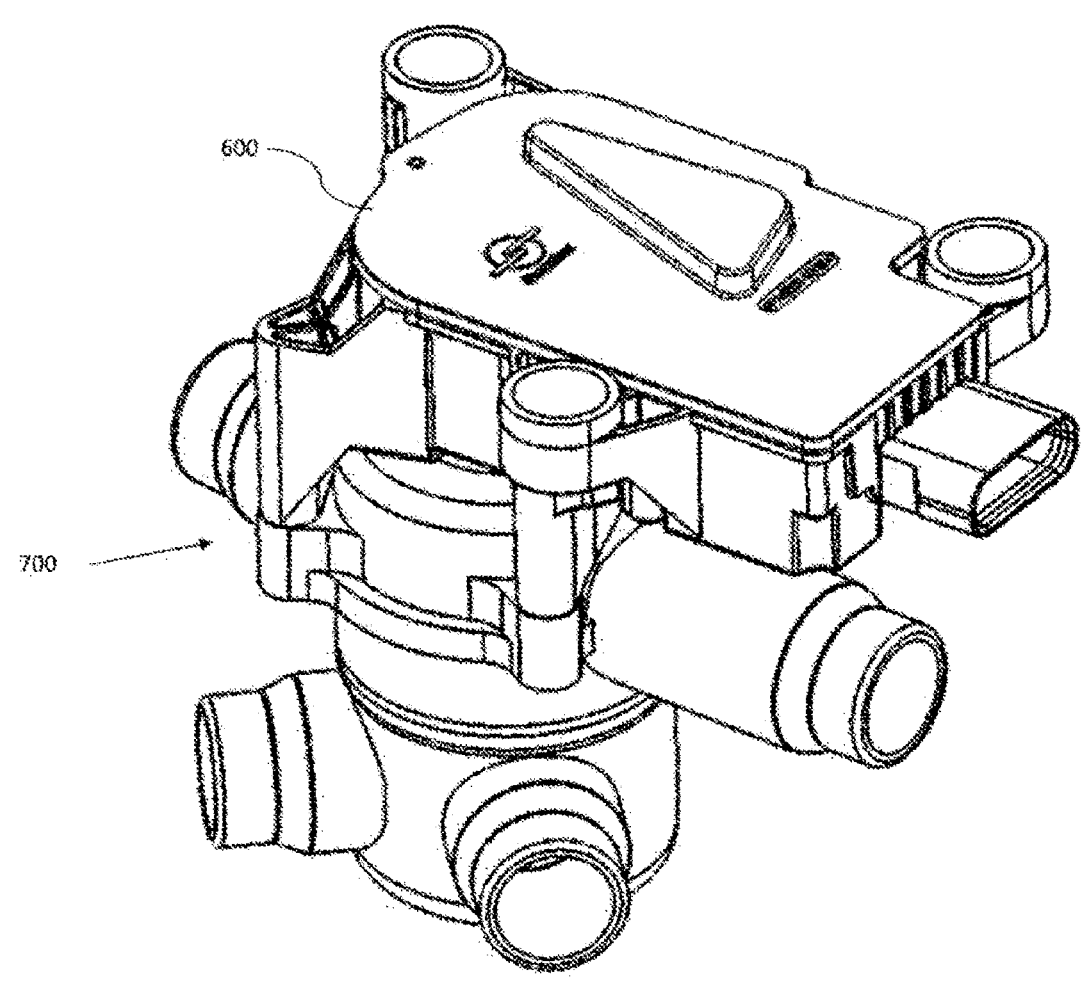
FIG. 4 shows the integration of a positioning actuator into a valve.
Figure 5:
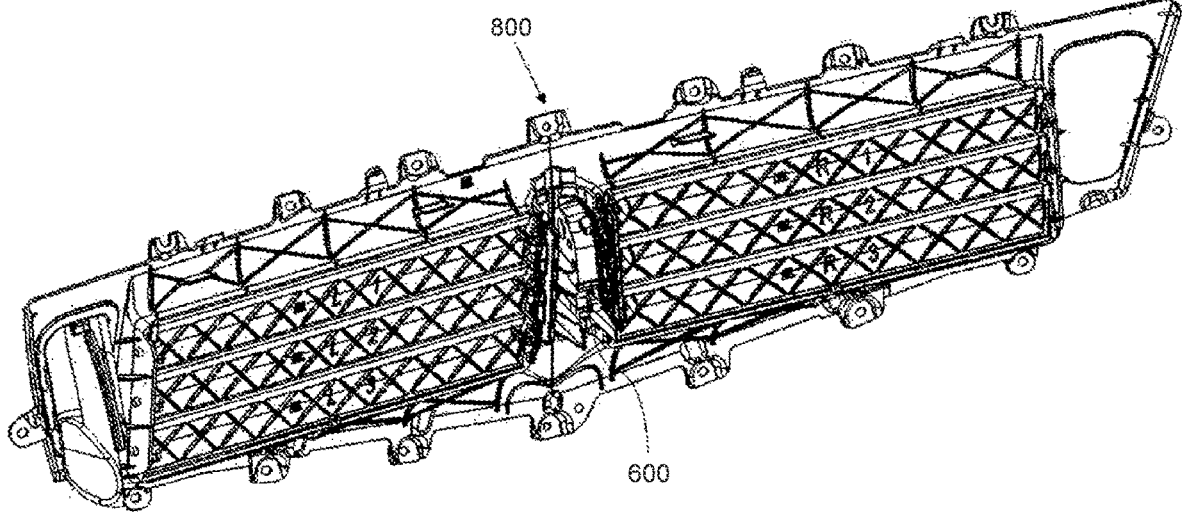
FIG. 5 shows the integration of a positioning actuator.
Figure 6:
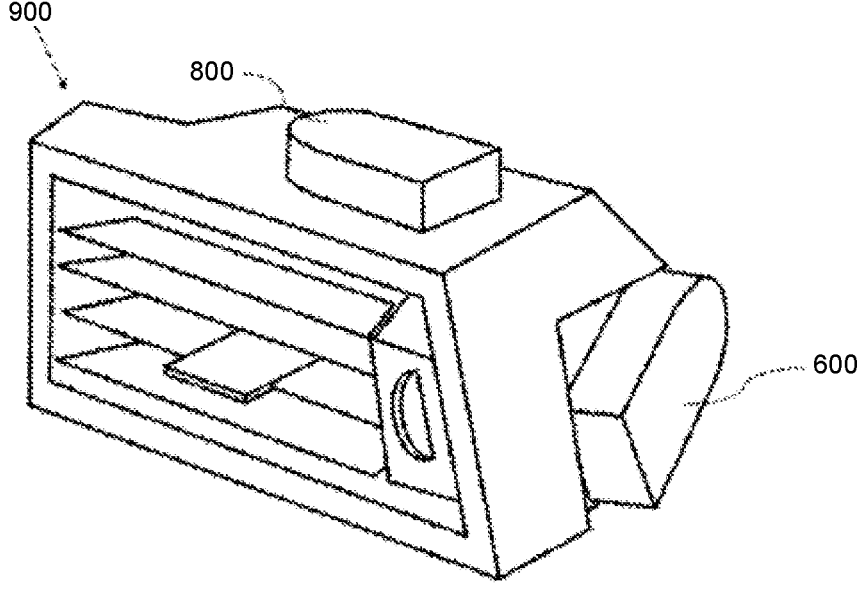
FIG. 6 shows a 3rd example integration of a positioning actuator.

Example application of the present disclosure are shown through FIGS. 4 to 6, though without limiting the scope thereof.

FIG. 4 shows the integration, into a valve (700), of a mechatronic system (600) according to the present disclosure. For example, when the valve (700) is associated with the thermal control system of the vehicle, a calibration sequence on startup is undesirable since it can disrupt the control loops as soon as the vehicle is powered on. As these valves are numerous in the thermal management system, the use of the present disclosure makes it possible to overcome that many absolute position sensors, leading to significant financial savings.

FIG. 5 shows an alternative embodiment of a mechatronic system (600) according to the present disclosure, with an air deflector (800) located at the front of the vehicle and making it possible to regulate the flow of air arriving on the radiator. Inaccurate knowledge of how far the deflector (800) is open can lead to significant overconsumption of fuel for the vehicle. In this case, a calibration step for knowing the position of the deflector (800) at the start of the vehicle, or during its unlocking, would cause significant noise, which would potentially be unpleasant for the user. This user experience is not desired, and is also accompanied by premature aging of the actuator, as this calibration step must be carried out during each usage cycle of the vehicle.

FIG. 6 highlights another variant integration of a mechatronic system (600) according to the present disclosure in the form of a positioning actuator. In this example, two positioning actuators are integrated into an aeration nozzle (900) for managing the air flows inside the passenger compartment. Since these nozzles (900) can be moved by the user during the periods when the vehicle is not in operation, it is necessary to know these movements in order to avoid a calibration each time it is powered up, which may be an undesired experience by the users.

Another example application, not shown, is that of implementing an embodiment of the present disclosure in an electric door opened by pressure applied by the user, for example, a fuel door. As refueling is powered off for safety reasons, the integration of a position sensor utilizing a standby mode makes it possible to power the opening system of the electric door when requested by the user.

FIG. 7 shows a variant architecture of the mechatronic system (600) for which the sensor, either the assembly composed of magnetosensitive probes (100 to 102) and the permanent magnet (300), whose position they measure, is not located inside the housing (500) but is offset as close as possible to the driven mechanical member whose position is to be measured. The mechanical member is driven by the electric actuator (50) through a transmission (60). This configuration is advantageous whenever the housing (500) of the actuator, containing the drive electronics (200) and the electric actuator (50), cannot be located as close as possible to the mechanical member to be driven, the reason being due, for example, to a lack of available space or to an excessively constrained environment (temperature, physical/chemical medium, etc.). This variant also shows a version where all of the peripherals of the drive electronics are internal functionalities of the microcontroller (20).

The invention claimed is:

1. A mechatronic system comprising a housing including an electric actuator for driving a mechanical member, and drive electronics for controlling the electric actuator associated with a position sensor consisting of at least one magnetosensitive probe, at least one magnetosensitive probe being a programmable digital switch delivering an electrical signal dependent on an angular position of a permanent magnet driven by the mechanical member, wherein the drive electronics comprise a microcontroller having at least one wake-up mode corresponding to an activation of the microcontroller only by a programmable wake-up circuit, the drive electronics and/or the programmable digital switch comprises a read-only EEPROM memory, the position sensor comprises a programmable wake-up circuit delivering a signal to a first bus in response to a mobile member moving, the position sensor has a standby consumption of less than 100 µA, one of the microcontroller of the drive electronics or a microcontroller of the magnetosensitive probe controlling, upon activation by a wake-up signal transmitted by the programmable digital switch:

a) an initialization of an access control register to the EEPROM memory, b) writing of a digital datum to an EEDATA register of the EEPROM memory, c) switching to rest mode at an end of a predetermined period counted starting from a last transmission of a signal by the position sensor.

2. The mechatronic system of claim 1, wherein the microcontroller of the drive electronics has at least two wake-up modes including a first mode corresponding to the activation of the microcontroller of the drive electronics alone, and a second mode corresponding to the activation of the microcontroller of the drive electronics and peripherals.

3. The mechatronic system of claim 1, wherein the EEPROM memory is integrated into the drive electronics.

4. The mechatronic system of claim 1, wherein the EEPROM memory is integrated into the programmable digital switch.

5. The mechatronic system of claim 1, wherein the at least one magnetosensitive probe comprises three magnetosensitive probes, the three magnetosensitive probes being programmable digital switches, and wherein the data recorded in the EEPROM memory corresponding to the digital value of the movement is determined as a function of the state of the three programmable digital switches.

6. The mechatronic system of claim 1, further comprising multiple reduction stages driving an output wheel.

7. The mechatronic system of claim 6, wherein the position sensor measures an angular position of the output wheel.

8. The mechatronic system of claim 6, wherein the permanent magnet constitutes a rotor of the electric actuator.

9. A method for controlling a mechatronic system comprising a housing including an electric actuator for driving a mechanical member, and drive electronics for controlling the electric actuator associated with a position sensor comprising at least one magnetosensitive probe, at least one magnetosensitive probe being a programmable digital switch delivering an electrical signal dependent on an angular position of a permanent magnet driven by the mechanical member, wherein the drive electronics comprise a microcontroller having at least one wake-up mode corresponding to the activation of the microcontroller only by a programmable wake-up circuit, the drive electronics and/or the programmable digital switch comprise a read-only EEPROM memory, the position sensor comprises a programmable wake-up circuit delivering a signal to a first bus in response to the mobile member moving, the position sensor has a standby consumption of less than 100 µA, one of the microcontroller of the drive electronics and a drive controller of the magnetosensitive probe controlling, upon activation by a wake-up signal transmitted by the programmable digital switch:

a) the initialization of an access control register to the EEPROM memory, b) the writing of a digital datum to an EEDATA register of the EEPROM memory, c) the switching to rest mode at an end of a predetermined period counted starting from a last transmission of a signal by the position sensor.

10. The method of claim 9, wherein the microcontroller of the drive electronics has at least two wake-up modes including a first mode corresponding to an activation of the microcontroller of the drive electronics alone, and a second mode corresponding to an activation of the microcontroller of the drive electronics and peripherals.

11. The method of claim 9, wherein the EEDATA register contains by default a first value VO during a stopping of the mechatronic system, and the activation of the wake-up by a signal on a port orders the microcontroller of the drive electronics to perform a verification of the content of the EEDATA register, and, a) in the case where the content is different from the first value VO, the microcontroller of the drive electronics controls an initial step of recalibrating the position and then writing, in the EEDATA register of the EEPROM memory, the first value VO, and b) in the case where the content of the register is the first value VO, proceeding directly to a normal operating mode.

12. The method of claim 9, the digital datum recorded in the EEPROM is a first value VO during a stopping of the mechatronic system, and a second value VALPHA during a detection of a modification of the position, the value VALPHA corresponding to the position after modification, and wherein, when power is restored to the mechatronic system, the EEDATA register is ordered to switch to read mode and the value VALPHA is ordered to be transferred to the register of random-access memory intended for the recording of the position provided by the sensor.

* * * * *